United States Patent [19]

Bernhardt

[11] Patent Number: 4,892,688

[45] Date of Patent: Jan. 9, 1990

[54] ARRANGEMENT FOR EXPELLING LIGHT VOLATILE CONTAMINANTS FROM LIQUIDS

[75] Inventor: Bruno Bernhardt, Reutlingen-Betzingen, Fed. Rep. of Germany

[73] Assignee: IEG Industrie-Engineering GmbH, Reutlingen, Fed. Rep. of Germany

[21] Appl. No.: 216,942

[22] Filed: Jul. 8, 1988

[51] Int. Cl.⁴ .............................................. B01F 3/04
[52] U.S. Cl. ...................................... 261/24; 261/120; 261/122
[58] Field of Search ........................... 261/24, 120, 122

[56] References Cited

U.S. PATENT DOCUMENTS

| | | | |
|---|---|---|---|
| 695,125 | 3/1902 | Sue | 261/120 |
| 744,877 | 11/1903 | Parrott | 261/120 |
| 828,494 | 8/1906 | Miles | 261/120 |
| 1,305,944 | 6/1919 | Smith | 261/120 |
| 1,708,587 | 4/1929 | Patterson | 261/120 |
| 3,193,260 | 7/1965 | Lamb | 261/120 |
| 3,498,029 | 3/1970 | Feuersanger | 261/120 |
| 4,116,488 | 9/1978 | Hsueh et al. | 261/122 |
| 4,304,739 | 12/1981 | Thome | 261/120 |
| 4,624,626 | 11/1986 | Sherfinski et al. | 261/DIG. 75 |
| 4,735,750 | 4/1988 | Damann | 261/120 |

*Primary Examiner*—Tim Miles
*Attorney, Agent, or Firm*—Michael J. Striker

[57] ABSTRACT

To expel volatile contaminants from a liquid body, outer air is introduced into a perforated container arranged below the liquid surface and having an open bottom by the action of a suction blower creating an underpressure above the liquid surface. Air bubbles exiting through the perforated top wall of the container entrain the volatile contaminants and expel the same into the underpressure area. The air receiving perforated container is either suspended on a float or fixedly arranged relative to the bottom of the receptacle.

2 Claims, 4 Drawing Sheets

ARRANGEMENT FOR EXPELLING LIGHT VOLATILE CONTAMINANTS FROM LIQUIDS

BACKGROUND OF THE INVENTION

The present invention relates to an arrangement for expelling light volatile contaminating components from a liquid, such as for example from an underground water, by means of air or other gases.

It has been already known to attack waste water with air in order to expel light volatile contaminents such as for example chemical solvents. Arrangements and devices for carrying out this prior art method however are very expensive in design. For example the liquid to be purified is fed over scrubbing bodies arranged in a counterstream of fresh air or the water is conducted over a plurality of cascades into which pressure air is injected. Most of these known devices require a considerable energy consumption in order to force a pressure air through a water column or through a water layer whereby, in order to achieve an efficient aeration regulation of liquid level is necessary. Due to the pressure decrease in the liquid body from below upwards, air bubbles increase in volume during their ascent thus contributing to the formation of a non-desired foam in the liquid.

SUMMARY OF THE INVENTION

An object of this invention is to avoid the disadvantages of prior art arrangements of this kind.

In particular, it is an object of this invention to provide an arrangement for expelling volatile contaminants from a liquid which can be constructed at substantially lower cost.

Another object of this invention is to provide such an arrangement which consumes less energy during its operation without impairing its efficiency.

In keeping with these objects and others which will become apparent hereafter, one feature of this invention resides in the provision of an upright receptacle for receiving a liquid to be decontaminated, the receptacle having a top opening and the liquid reaching a level below the top opening, a suction blower arranged in the top opening to create underpressure in a space above the liquid level by exhausting air therefrom, a gas filled container arranged between said liquid level and the bottom of said receptacle and communicating via conduit with the outer atmosphere, said gas filled container having an open bottom and a perforated top wall for passing air from the container into the liquid whereby the ascending air bubbles entrain volatile contaminants and transfer the same into the space above the liquid level.

Due to the underpressure created by the suction ventilator above the liquid level the air from the outer atmosphere is drawn as the so-called stripping air into the gas filled container and is discharged therefrom through the perforations of the top wall and ascends in the form of air bubbles through the liquid body into the space above the liquid level. The stripping air sucked in from the outer atmosphere or another carrier gas for example nitrogen, comes in contact with contaminating components in the liquid such as, for example, hydrocarbon chlorides only during its passage in the form of little underpressure bubbles through the liquid body whereby the little bubbles exert in addition to the normal diffusion effect also a suction effect due to their underpressure.

The air filled container can be arranged either on the bottom of the upright receptacle or at the bottom of a well or can be designed in the form of a processing chamber forming a bottom part of the receptacle or well. In another embodiment, the air filled container is floating in an intermediate position between the liquid level and the bottom of the receptacle. In this case, the perforated top wall of the air filled container is suspended by means of adjustable spacers such as for example by chains, on a float ring. The length of the suspension chains is constant during operation but can be adjusted according to particular operational conditions. The conduit connecting the air filled container with the outer atmosphere is preferably in the form of a flexible hose. The floating arrangement of the perforated air filled container has the advantage that an expensive level regulating device which must have been installed in the water filled area of the receptacle can be dispensed with. The float ring makes it possible to keep the air filled container at a constant distance from the liquid level irrespective of the degree of filling of the receptacle or well. As mentioned before, the constant distance is adjustable by the selection of a desired length of the suspension chains. In operation of the arrangement of this invention, less energy is required for the creation of underpressure by the suction of air from the interspace above the liquid level than in conventional aeration devices operating with pressure air. The efficiency of the device of this invention is so large that it makes it possible to remove not only hydrocarbon chlorides but also other types of hydrocarbons, alcohols and benzene groups.

The air receiving container or its perforated top wall match with advantage the cross-section of the receptacle or of the well, and the perforated top wall extends parallel to the liquid surface. The size of perforations is elected such as to allow the distribution of the air drawn from the outer atmosphere over the entire lower side of the top wall. In the case of a floating arrangement of the gas receiving container, the flexible hose leading to the outer atmosphere must be of sufficient length as to permit the container to follow without obstruction the fluctuations of the liquid level. It has been found that the outer air drawn into the perforated gas filled container having an open bottom causes a circulation in the underlying part of the liquid body which in turn causes an upward flow of the liquid from the underlying part into the upper aireated liquid portion.

For cleaning underwater, the receptacle is a well, for example, in the form of a vertical borehole in the ground which is at least partially reinforced by a perforated casing or by perforated rings. Through experience, the column of water collected in the well due to the underpressure created in the space above the water level has a higher head than that of the surrounding underground water. In addition, due to the underpressure in the upper part of the well, the air present in the ground area around the upper part is drawn into the free part of the well whereby the decontamination of the air around the well is achieved. For this purpose, the surface region around the top rim of the well is covered by an air non-permeable foil.

With advantage, the air discharged from the suction blower together with a portion of the outer air is fed through a filter arranged upstream or downstream of the suction blower. The filter is for example an activated charcoal for separating the contaminating constituents.

When a large quantity of liquid is to be decontaminated, it is of advantage when a series of partial quantities of the liquid are treated one after the other. For this purpose, the receptacle is preferably divided by an intermediate partition into an upper supply chamber for a partial quantity of liquid to be treated and a lower processing chamber provided with the perforated partition of the air receiving container and being connected to a suction blower via an upright tube passing through the upper supply chamber. The liquid from the supply chamber is fed into the blower processing chamber through a valve controlled conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
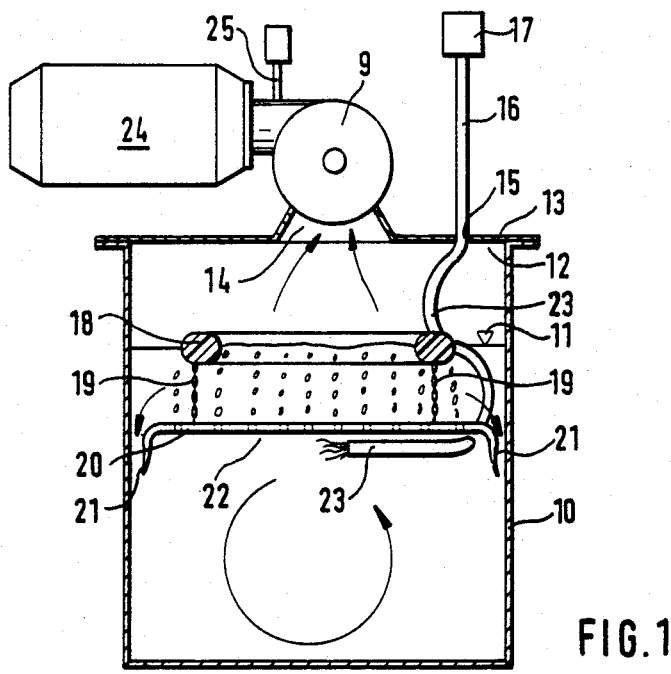
FIG. 1 is a simplified sectional side view of a first embodiment of the arrangement of the invention.

FIG. 1 shows receptacle 10 containing a liquid to be decontaminated. The liquid fills the receptacle up to a level 11 which is a distance below the top opening 12 of the receptacle. The top opening 12 is covered by a cover 13 provided with a central opening 14 for receiving a suction side of a blower 9. In another opening 15 in the cover 13 an outer air suction pipe 16 with an input air filter 17 is installed. Within the receptacle 10 a float ring 18 is provided to float on the liquid suface 11. A perforated top wall 20 of an open bottom air receiving container 22 is suspended by means of flexible and adjustable spacers 19, for example by means of chains. In this example, the air receiving container 22 is delimited by a lateral wall 21 which is spaced apart a small distance from the inner wall of the receptacle 10. The interior of the air filled container 22 communicates with the outer air feeding conduit 16 by means of a flexible hose passing through the perforated top wall 20. If it is desirable to compensate a too small cross-section and/or an excessive length of the flexible hose 23, then a small blower for amplifying the air supply can be stored at the input of the outer air feeding conduit 16.

Underpressure generated by the suction blower 9 in the space above the liquid level 11 takes effect also in the air receiving container 22 and causes the suction of air from the outer atmosphere through the air filter 17, conduit 16 and hose 23. At the same time, the air escapes through the perforations in the top plate 20 and ascends in the form of bubbles which entrain easily volatilized substances from the liquid. The air sucked out from the receptacle by the blower 9 is filtered by an activated charcoal filter 24. At the inlet of the filter 24, a suction conduit 25 opens in the outer atmosphere to introduce a small amount of outer air into the filter in order to reduce the degree of saturation.

Figure 2:
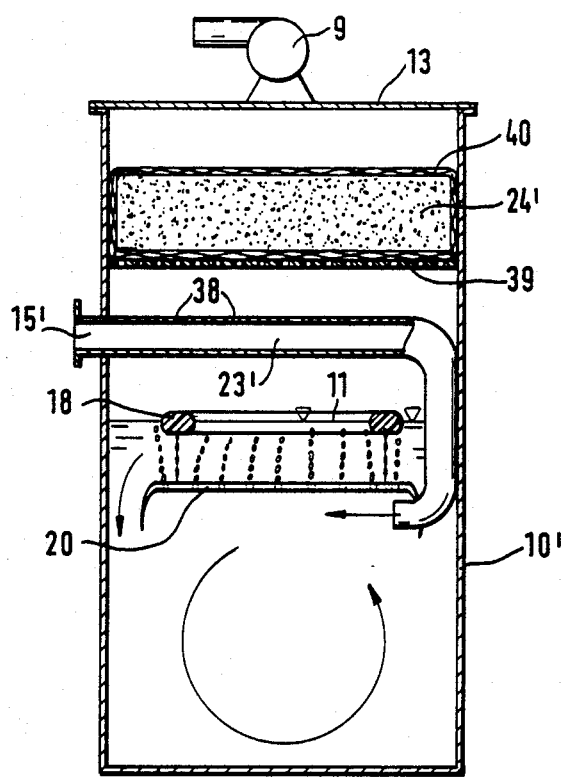
FIG. 2 is a modification of the embodiment of FIG. 1.

FIG. 2 illustrates a modified embodiment of the arrangement of FIG. 1. The difference is in the provision of an activated charcoal filter 24' in the top part of the receptacle 10' before the suction side of the blower 9. The activated charcoal filter 24' is in the form of a bag 40 filled with the activated charcoal and lying on an intermediate perforated partition 39 located approximately midway in the free space above the liquid level 11. The partition 39 serves simultaneously as water separator. The outer air for the floating air receiving container is introduced through an inlet opening 15' located laterally below the intermediate perforated partition 39 and communicating with the floating air receiving container by a flexible hose 23'. A part of the hose 23' is guided parallel to the perforated intermediate partition 39 and is provided with openings 38 through which a portion of the outer air flow is released into the activated charcoal filter 24' to reduce its degree of saturation. The rest of this modified arrangement is the same as in the example of FIG. 1.

Figure 3:
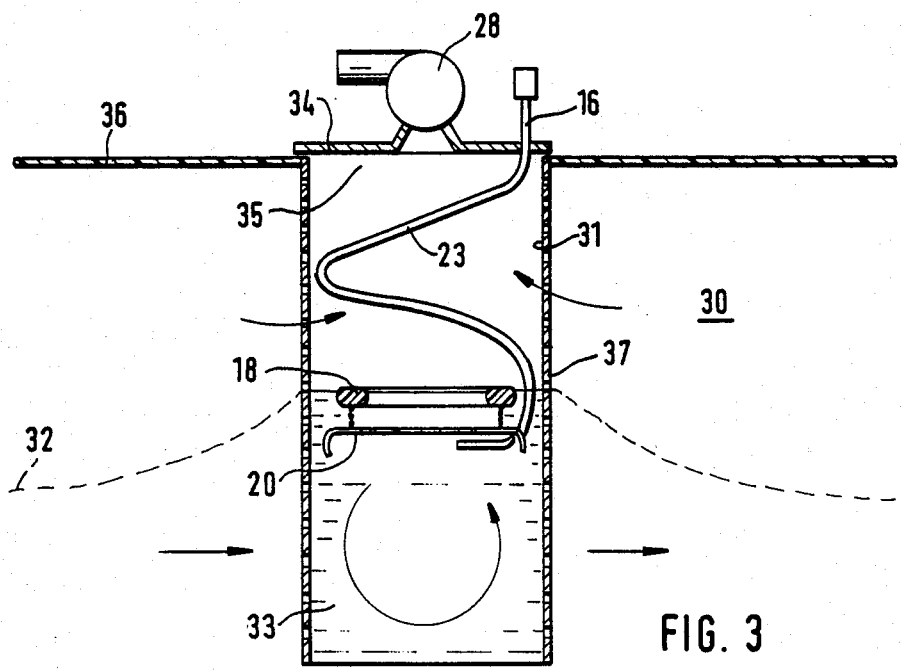
FIG. 3 is a second embodiment of the arrangement of this invention for decontaminating underground water in a well.

FIG. 3 shows an embodiment of this invention for decontaminating underground water. In the proximity of a contaminated location a borehole 31 is drilled into the ground 30. The depth of the borehole is below the level 32 of underground water as indicated by dashed line. The borehole in conventional manner can be reinforced by a perforated casing 37 or by superposed sieve rings. Underground water 33 accumulated in the lower part of the well or borehole 31 is decontaminated by means of the arrangement described before in connection with FIG. 1. That means an open bottom air receiving container having a perforated top wall 20 is suspended on a float ring 18 and communicating via a hose 23 with an outer air feeding conduit 16 passing through a cover 34 which closes the borehole 31. A blower 38 is again arranged in the center opening of the cover 34 to generate underpressure in the free space 35 above the water level. Due to the underpressure, outer air sucked in through the conduit 16 and the hose 23 under the perforated top plate 20 is released in the form of bubbles ascending through the liquid into the free space 35. In addition, due to the underpressure the water level in the borehole 31 is higher than that of the surrounding underground water 32. At the same time, air present in the ground 30 is sucked into the free space 35 of the borehole and consequently the adjoining air is purified from the volatile contaminants. In order to increase aeration range of the adjoining ground, the ground surface area around the mouth of the borehole 31 is covered by a wide foil 36 which is impermeable to air.

Figure 4:
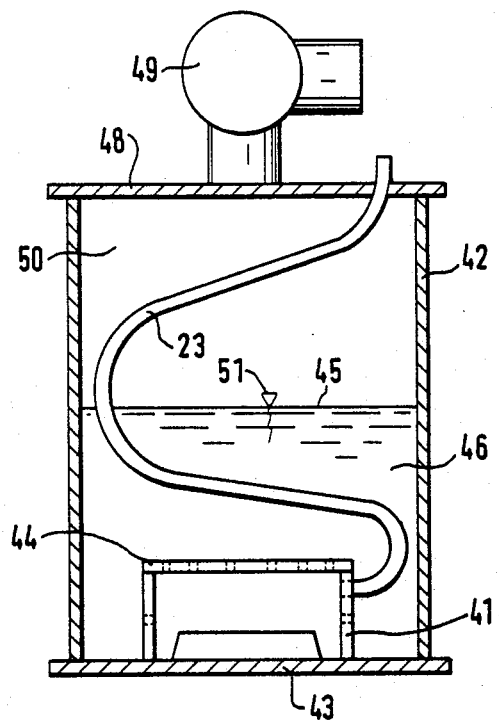
FIGS. 4 and 5 show respectively in sectional side views a third embodiment of the arrangement of this invention illustrated in a rest condition and in an operative condition.
Figure 5:
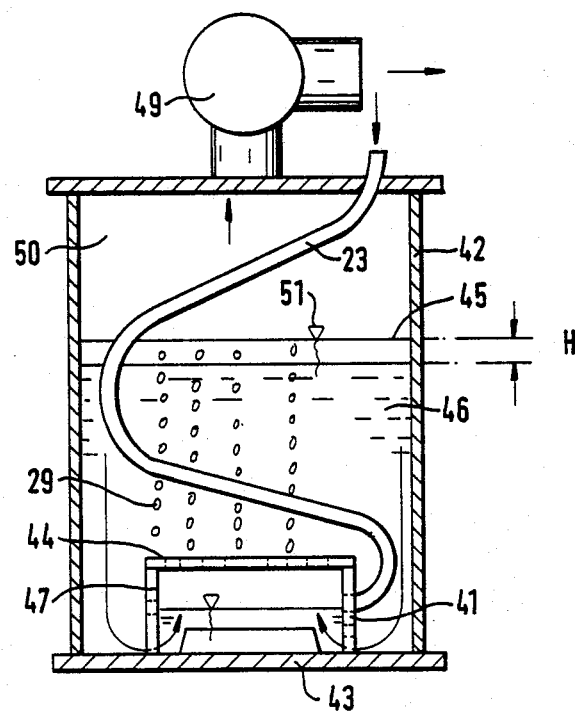

FIGS. 4 and 5 illustrate an embodiment in which an air receiving container 41 is fixedly arranged on the bttom 43 of a receptacle 42. The bottom part of the container 42 is open and the top wall 44 of the container is perforated and extends parallel to the bottom 43 and to the liquid level 45 in the receptacle. The liquid 46 to be decontaminated enters a lower part of the container 41 through openings provided in the lower portion of the lateral wall of the container adjacent the bottom 43 up to a level determined by an air filled space 47 below the perforated top wall 44. As described in the preceding examples, a hose 23 leading to the outer atmosphere opens into the air receiving container 41 immediately bow the lower side of the perforated top plate 44. In the rest condition of the arrangement as indicated in FIG. 4, the liquid 46 fills up the whole volume of the air receiving container 41. When suction blower 49 mounted in the center opening of the cover 48 of the receptacle 42 is set into operation and an underpressure develops in the free space 50 above the water level 45 in the receptacle the hose 23 starts sucking air from the outer atmosphere whereby an air filled space 47 builds up below the perforated top plate 44 and air escapes through the perforations in the form of underpressure little bubbles 51 which ascend through the liquid 46 into the underpressurized space 50. It will be seen from FIG. 5 that due to the development of the air filter space 47 in the container 41, the head of liquid 46 increases by a height increment H in comparison to the height of water level 45 in FIG. 4. By means of a schematically indicated floating switch 51 the height of the liquid level 45 in the container 42 can be regulated.

Figure 6:
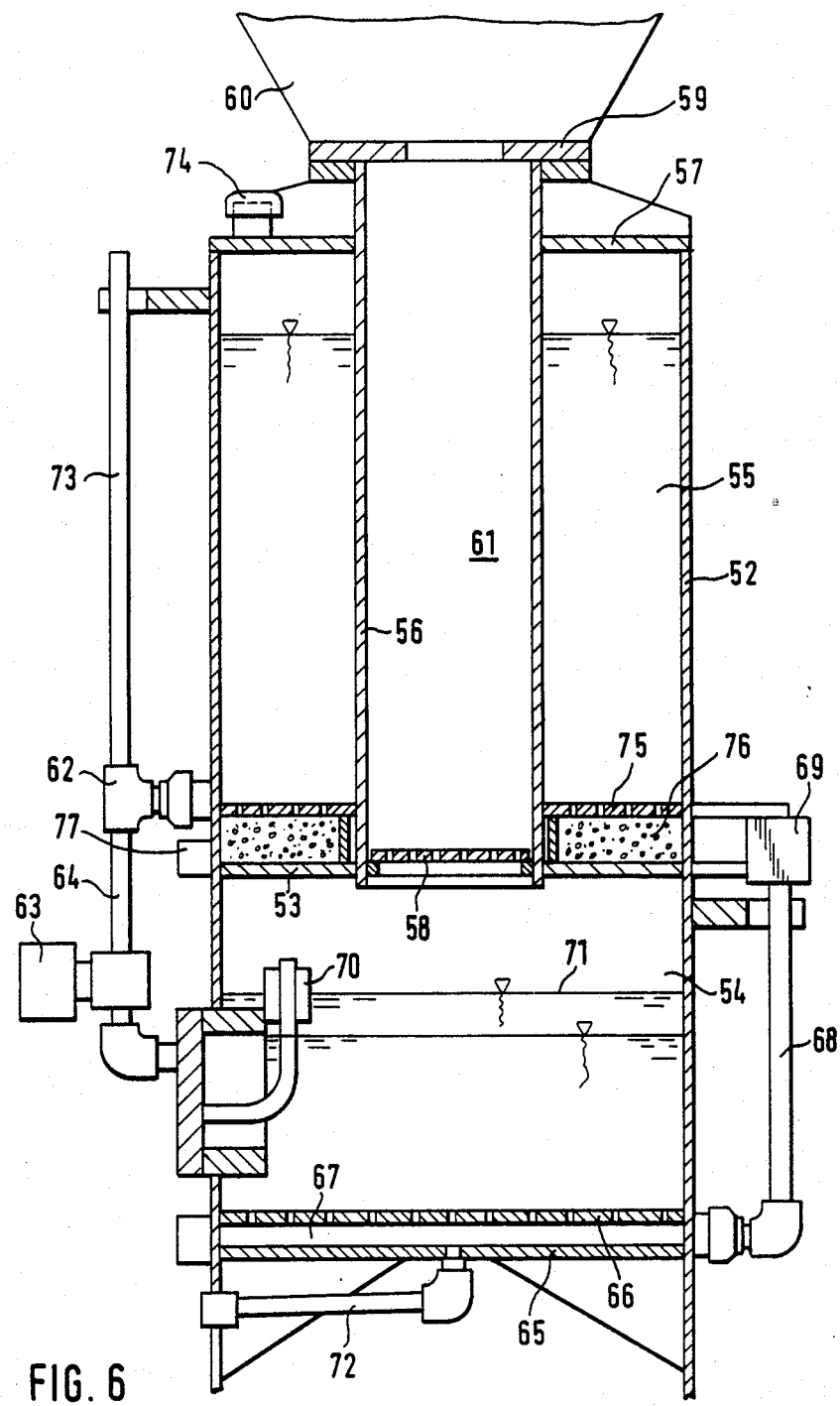
FIG. 6 is a sectional side view of a fourth embodiment of the arrangement of this invention.

FIG. 6 illustrates an embodiment of the arrangement of this invention which is suitable for a batchwise treatment of larger quantities of liquids to be decontaminated. The arrangement includes an upright receptacle 52 which is separated by an intermediate partition 53 into a lower treatment chamber 54 and an upper liquid supply chamber 55. An upright tubular member 56, extends through a center opening in the intermediate partition 53 through the supply chamber 55 and passes outward through a center opening in the cover 57 which closes the receptacle 52. The lower end of the central tubular member 56 is closed by a perforated plate 58. The outwardly projecting top portion of the central tubular member is provided with a mounting flange 59 upon which a schematically indicated suction blower 60 is fastened. The inner space 61 of the tubular member 56 is filled with activated charcoal and accordingly constitutes a filter for air sucked out by the blower 60 from the lower processing chamber 54.

A quantity of liquid to be treated is first collected in the supply chamber 55 and then transferred via a conduit 64 controlled by a three-way valve 62 and a solenoid valve 63 into the processing chamber 54. The processing chamber 54 is separated from the bottom 65 of the receptacle 52 by a fixedly mounted perforated partition 66 extending parallel to the bottom 65 and delimiting therewith an air collecting space 67 which communicates via a conduit 68 and a filtering or throttling device 69 with the outer atmosphere. It is to be understood that the outer end of the air conduit 68 is located above the fluctuation range of the liquid level 71 within the processing chamber 54. The height of the liquid level is regulated by a floating switch 70. After completing the purifying treatment, the liquid is discharged from the processing chamber 54 through an outlet conduit 72 located at the bottom of the receptacle 52.

A quantity of liquid to be treated is fed into the supply chamber 55 through a conduit 73 controlled by the beforementioned three-way valve 62. Alternatively, the liquid can be introduced into the supply chamber by a connection piece 74 located in the cover 57. In the latter case the external feeding conduit 73 acts as a ventilating conduit and three-way valve 62 can be eliminated. If desired, a perforated partition 75 is provided in the supply chamber above the intermediate partition 53 to delimit therewith a separating or collecting space 76 in which heavy contaminents from the liquid accumulate and are withdrawn through a lateral connection piece 77.

While the invention has been illustrated and described as embodied in specific examples of arrangement for expelling volatile contaminants from a liquid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for expelling volatile contaminants from a liquid, comprising a receptacle for receiving the liquid to be decontaminated, said receptacle having a top cover formed with an opening; a suction blower arranged in said opening to generate underpressure in a free space between a top surface of said liquid and said cover by exhausting air therefrom; a gas receiving container having an open bottom and a perforated top wall arranged below the top surface of the liquid in said receptacle and extending substantially parallel thereto; suction conduit means connecting said gas receiving container with the outer atmosphere whereby, upon creation of an underpressure in the free space outer air is sucked through said suction conduit means and is discharged in the form of bubbles through the perforations of said top wall to ascend through the liquid into said free space, said receptacle being a borehole drilled vertically in the ground and reinforced at least partially by one of a perforated casing and sieve rings.

2. An arrangement as defined in claim 1 wherein a ground surface area around a mouth of said borehole is covered by a foil impermeable to air.

* * * * *